(12) United States Patent
Nakane

(10) Patent No.: US 8,204,647 B2
(45) Date of Patent: Jun. 19, 2012

(54) ELECTRIC POWER STEERING SYSTEM

(75) Inventor: Naoki Nakane, Toyota (JP)

(73) Assignee: Denso Corporation, Kariya (JP)

( * ) Notice: Subject to any disclaimer, the term of this patent is extended or adjusted under 35 U.S.C. 154(b) by 440 days.

(21) Appl. No.: 12/495,907

(22) Filed: Jul. 1, 2009

(65) Prior Publication Data

US 2010/0004817 A1    Jan. 7, 2010

(30) Foreign Application Priority Data

Jul. 4, 2008 (JP) ................................. 2008-175266

(51) Int. Cl.
*B62D 5/00* (2006.01)

(52) U.S. Cl. .......... 701/35; 701/42; 701/29.1; 701/29.2; 701/29.6; 701/31.8; 701/32.9; 701/33.6; 701/33.7; 701/33.8; 180/402; 180/417; 180/421; 180/443; 180/446

(58) Field of Classification Search .................. None
See application file for complete search history.

(56) References Cited

U.S. PATENT DOCUMENTS

| | | | | |
|---|---|---|---|---|
| 5,912,539 | A * | 6/1999 | Sugitani et al. | 318/434 |
| 6,013,994 | A * | 1/2000 | Endo et al. | 318/432 |
| 6,041,884 | A * | 3/2000 | Shimizu et al. | 180/443 |
| 6,148,949 | A * | 11/2000 | Kobayashi et al. | 180/446 |
| 6,370,459 | B1 * | 4/2002 | Phillips | 701/41 |
| 6,422,335 | B1 * | 7/2002 | Miller | 180/446 |
| 6,598,698 | B2 * | 7/2003 | Murata et al. | 180/443 |
| 6,609,052 | B2 * | 8/2003 | Radamis et al. | 701/41 |
| 6,889,794 | B2 * | 5/2005 | Higashira et al. | 180/444 |
| 6,899,196 | B2 * | 5/2005 | Husain et al. | 180/402 |
| 7,852,023 | B2 * | 12/2010 | Kifuku et al. | 318/139 |
| 2002/0020229 | A1 * | 2/2002 | Nakamura et al. | 73/862.333 |
| 2002/0033301 | A1 * | 3/2002 | Clephas | 180/446 |
| 2002/0148675 | A1 * | 10/2002 | Higashira et al. | 180/446 |
| 2003/0217607 | A1 * | 11/2003 | Tokumoto et al. | 73/862.191 |
| 2004/0167694 | A1 * | 8/2004 | Tamai | 701/41 |
| 2005/0072621 | A1 * | 4/2005 | Hara et al. | 180/444 |
| 2005/0150712 | A1 * | 7/2005 | Tokumoto | 180/443 |
| 2006/0117870 | A1 | 6/2006 | Tokumoto et al. | |
| 2006/0200289 | A1 * | 9/2006 | Chino et al. | 701/41 |

(Continued)

FOREIGN PATENT DOCUMENTS

JP          63-173760          7/1988

(Continued)

OTHER PUBLICATIONS

Japanese Office Action dated Apr. 27, 2010, issued in corresponding Japanese Application No. 2008-175266, with English translation.

*Primary Examiner* — Jonathan M Dager

(74) *Attorney, Agent, or Firm* — Nixon & Vanderhye P.C.

(57) ABSTRACT

In an electric power steering system, an electric motor generates output power for power-assisting steering operation of a steering wheel, a torque sensor generates a plurality of electric output signals corresponding to a torque applied to the steering wheel, and a control unit controls the steering operation of the electric motor in accordance with at least one of the electric output signals of the torque sensor. The control unit detects a difference between rotation speeds of left and right steered wheels, checks whether any one of the plurality of output generating parts is in failure, and specify a failing-device based on the rotation speed difference and the plurality of output signals.

4 Claims, 7 Drawing Sheets

U.S. PATENT DOCUMENTS

| | | | |
|---|---|---|---|
| 2007/0017735 A1* | 1/2007 | Kataoka et al. | 180/446 |
| 2007/0069674 A1* | 3/2007 | Koeppl et al. | 318/432 |
| 2007/0107973 A1* | 5/2007 | Jiang et al. | 180/443 |
| 2008/0035411 A1* | 2/2008 | Yamashita et al. | 180/443 |
| 2008/0066994 A1* | 3/2008 | Fujita et al. | 180/446 |
| 2008/0243339 A1* | 10/2008 | Nishimori et al. | 701/41 |
| 2008/0294313 A1* | 11/2008 | Aoki et al. | 701/43 |
| 2009/0319117 A1* | 12/2009 | Nakane | 701/29 |
| 2009/0319120 A1* | 12/2009 | Hatanaka et al. | 701/34 |

FOREIGN PATENT DOCUMENTS

| | | |
|---|---|---|
| JP | 9-58505 | 3/1997 |
| JP | 2000-128003 | 5/2000 |
| JP | 2000-185660 | 7/2000 |
| JP | 2002-255054 | 9/2002 |
| JP | 2004-40850 | 2/2004 |
| JP | 2004-50972 | 2/2004 |
| JP | 2004-114755 | 4/2004 |
| JP | 2004-196128 | 7/2004 |
| JP | 2004-224077 | 8/2004 |
| JP | 2004-276697 | 10/2004 |
| JP | 2005-193834 | 7/2005 |
| JP | 2005-271860 | 10/2005 |
| JP | 2005-289190 | 10/2005 |
| JP | 2006-248354 | 9/2006 |
| JP | 2007-091069 | 4/2007 |
| JP | 2007-283891 | 11/2007 |

* cited by examiner

ELECTRIC POWER STEERING SYSTEM

CROSS REFERENCE TO RELATED APPLICATION

This application is based on and incorporates herein by reference Japanese Patent Application No. 2008-175266 filed on Jul. 4, 2008.

FIELD OF THE INVENTION

The present invention relates to an electric power steering system (EPS), which power-assists steering operation of a steering wheel by an electric motor.

BACKGROUND OF THE INVENTION

In conventional electric power steering systems, operation of an electric motor is controlled in accordance with torque applied to a steering wheel of a vehicle by a driver. Specifically, the torque is detected by a torque sensor assembled in a steering shaft of the steering wheel, for example, and outputted to an electronic control unit (ECU). The ECU controls the operation of the electric motor in accordance with a detected torque.

The EPS is mounted recently not only in light-weight vehicles but also in normal passenger vehicles. The number of vehicles in which steering operation of a steering wheel is power-assisted by the EPS is remarkably increasing. If the EPS fails to power-assist the steering operation, the load to the driver in steering the steering wheel suddenly changes. To counter this problem, various controls are proposed.

According to EPS of the following patent documents 1 to 7, even when a failure arises in the EPS, the power-assisting operation of the EPS is not stopped entirely but the electric motor is continued to be operated based on a control method, which is predetermined to avoid that the load to the driver in steering the steering wheel changes suddenly.

Since the controls proposed in the patent documents 1 to 7 are primarily for avoiding the sudden change in the steering load by the continuation of the power-assisting operation as an emergency measure. The assisting power in this instance is limited to a rather low assisting-power. Thus, it is necessary to gradually reduce the assisting power until it becomes null. It is required therefore to avoid stopping of the power-assisting operation by maintaining the assisting power, even when the EPS fails.

Patent document 1: JP 9-58505 A
Patent document 2: JP 2002-255054 A
Patent document 3: JP 2005-193834 A
Patent document 4: JP 2004-196128 A
Patent document 5: JP 2005-271860 A
Patent document 6: JP 2005-289190 A
Patent document 7: JP 2007-283891 A

SUMMARY OF THE INVENTION

It is therefore an object of the present invention to ensure power-assisting operation without lowering assisting power even at time of failure of an EPS.

According to the present invention, an electric power steering system of a vehicle has an electric motor, a torque sensor and a control unit. The electric motor generates output power for power-assisting steering operation of a steering wheel of the vehicle. The torque sensor includes a plurality of output generating parts configured to generate a plurality of electric output signals corresponding to a torque applied to the steering wheel. The control unit is configured to control the steering operation of the electric motor in accordance with at least one of the electric output signals of the torque sensor.

In one aspect, the control unit includes a difference detection part, a failure checking part and a failing device specifying part. The difference detection part is configured to detect a difference between rotation speeds of a left steered wheel and a right steered wheel of the vehicle. The failure checking part is configured to check whether any one of the plurality of output generating parts is in failure. The failing-device specifying part is configured to specify a failing-device based on the rotation speed difference and the plurality of electric output signals.

In another aspect, the control unit includes a difference detecting part and a failing-device specifying part. The difference detecting part is configured to detect a difference of rotation speeds between a left steered wheel and a right steered wheel of the vehicle. The failing-device specifying part is configured to specify periodically a failing device among the plurality of output generating parts based on the difference of rotation speeds and the plurality of electric output signals.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

An electric power steering system (EPS) according to a first embodiment is described in detail with reference to the figures.

Figure 1:
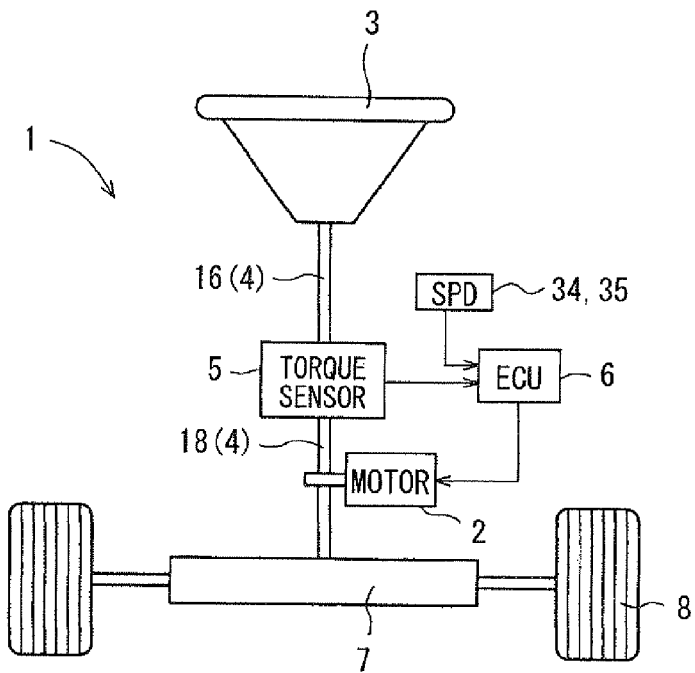
FIG. 1 is a schematic view of an electric power steering system according to a first embodiment of the present invention.

As shown in FIG. 1, an EPS 1 is for power-assisting steering operation of a steering wheel 3 by output power of an electric motor 2. The electric motor 3 is controlled in accordance with a torque, which a driver of a vehicle applies to the steering wheel 3. This torque is detected by a torque sensor 5, which is assembled for example in a steering shaft 4, and outputted to an electronic control unit (ECU) 6 so that the ECU 6 controls the operation of the electric motor 2 in accordance with the detected torque.

The EPS 1 is thus provided with the electric motor 2 for generating the output power to power-assist the steering operation of the steering wheel 3, the torque sensor 5 for generating an electric output signal corresponding to the torque applied to the steering wheel 3, and the ECU 6 for controlling the operation of the electric motor 2 based on the electric output signal generated by the torque sensor 5.

The torque applied to the steering wheel 3 is transferred to steered wheels (tire wheels) 8 through the steering shaft 4, a rack and pinion mechanism 7 and the like so that the steered wheels 8 are steered. The output power of the electric motor 2 is transferred to the rack and pinion mechanism 7, for example, so that steering of the steered wheels 8, that is, steering by the steering wheel 3, is power-assisted by the electric motor 2. The electric motor 2 may be any one of a variety of types of motors, which include a direct current (DC) motor, a brushless DC motor, a switched reluctance motor, a magnet-embedded synchronous motor and the like.

Figure 2:
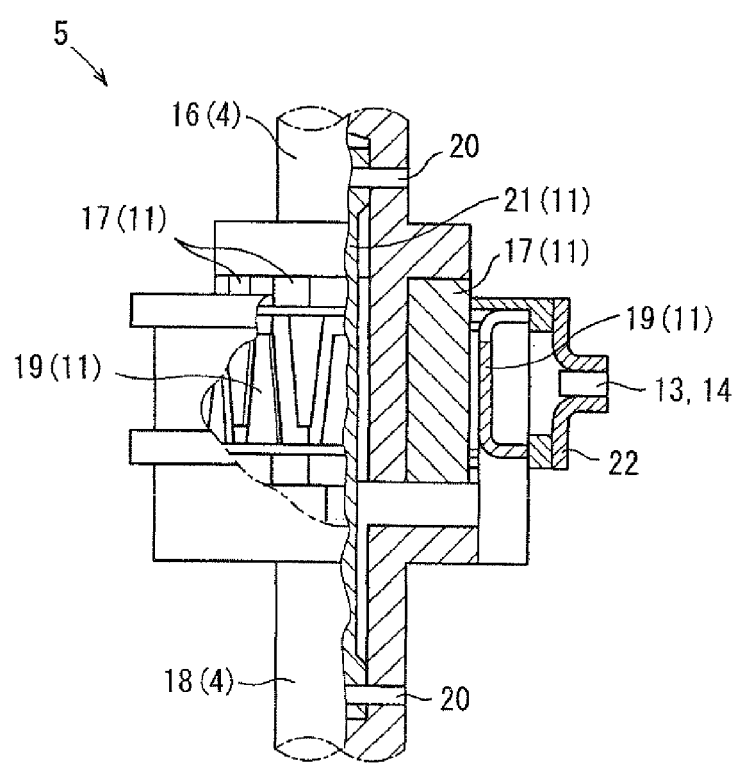
FIG. 2 is a partial cross-sectional view of a torque sensor used in the first embodiment.
Figure 3:
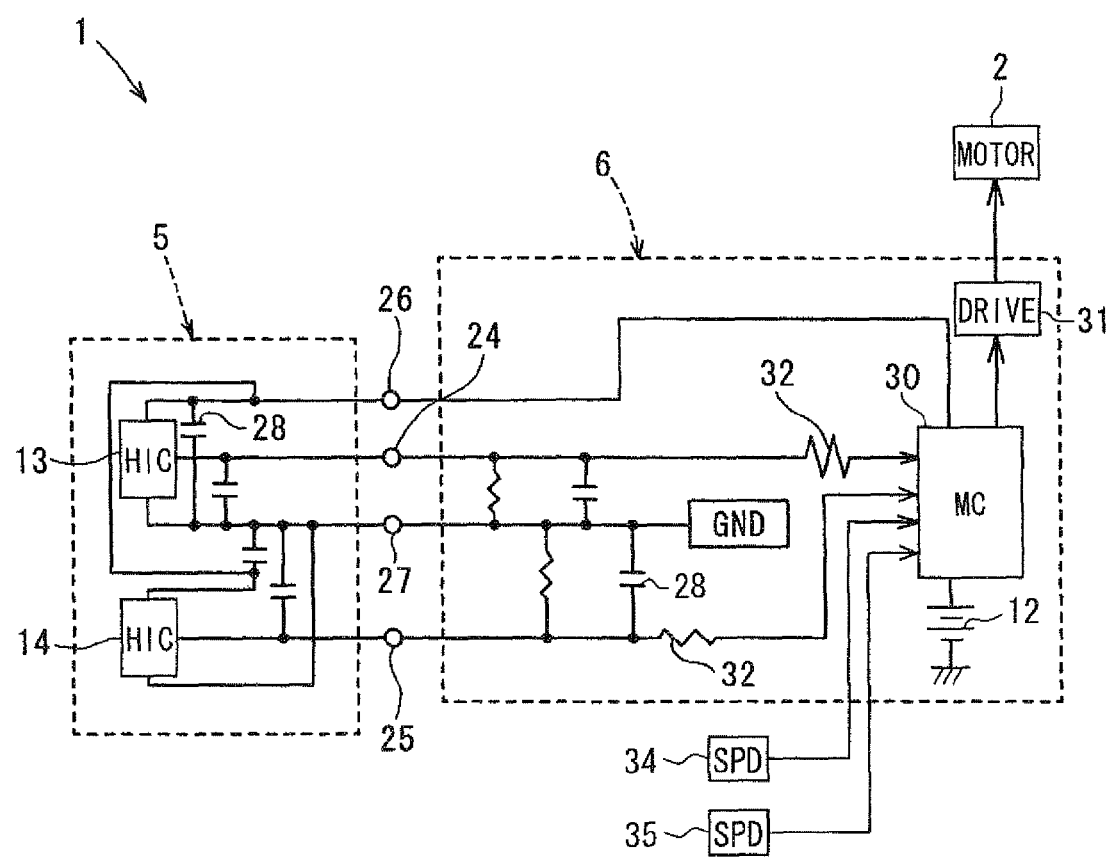
FIG. 3 is an electric circuit diagram of an ECU used in the first embodiment.

The torque sensor 5 has, as shown in FIGS. 2 and 3, a magnetic flux generating part 11 and two output parts 13 and 14. The magnetic flux generating part 11 generates magnetic flux varying with the steering operation of the steering wheel 3. The output generating parts 13 and 14 generate respective electric output signals corresponding to the magnetic flux generated by the magnetic flux generating part 11.

The magnetic flux generating part 11 is configured by permanent magnets 17, a comb-shaped yoke 19, a torsion bar 21 and the like. The magnets 17 are rotatable integrally with an input shaft 16 (steering shaft 4), which is on the side of the steering wheel 3. The comb-shaped yoke 19 is rotatable integrally with an output shaft 18 (steering shaft 4), which is on the side of the steered wheels 8, and collects the magnetic flux generated by the magnets 17. The torsion bar 21 is hooked to the output shafts 16 and 18 at both ends by pins 20 and twistable in accordance with the steering operation of the steering wheel 3.

Each of the output generating parts 13 and 14 is configured as a Hall IC (HIC) including a Hall element, an output circuit and the like. The Hall element is magnetically sensitive to the magnetic flux collected by a ring 22 through the yoke 19. The output circuit is configured to generate an electric output signal corresponding to the density of magnetic flux, which the Hall element sensed.

The Hall ICs 13 and 14 have, as shown in FIG. 3, respective output terminals 24 and 25 for outputting the respective electric output signals to the ECU 6. The Hall ICs 13 and 14 have a common input terminal 26 for receiving a regulated supply voltage from a power supply source 12 and a common ground terminal 27 for grounding the torque sensor 5. Noise filtering-out capacitors 28 are connected between the Hall ICs 13, 14 and the terminals and electric wires are arranged to absorb electromagnetic wave which is disturbance.

In place of the common input terminal 26 for receiving the supply voltage from the electric power source 12 and the common ground terminal 27 for grounding, a terminal for receiving the supply voltage and a ground terminal may be provided in each of the Hall ICs 13 and 14.

In the torque sensor 5, when the torsion bar 21 is twisted by the steering operation of the steering wheel 3, the magnets 17 and the yoke 19 displace relatively. This displacement varies the magnetic density of the magnetic flux, which the Hall element senses. Thus, the electric output signals generated by the Hall ICs 13 and 14 are varied. As a result, the torque sensor 5 generates the electric output signals in accordance with the torque applied to the steering wheel 3.

Figure 4A:
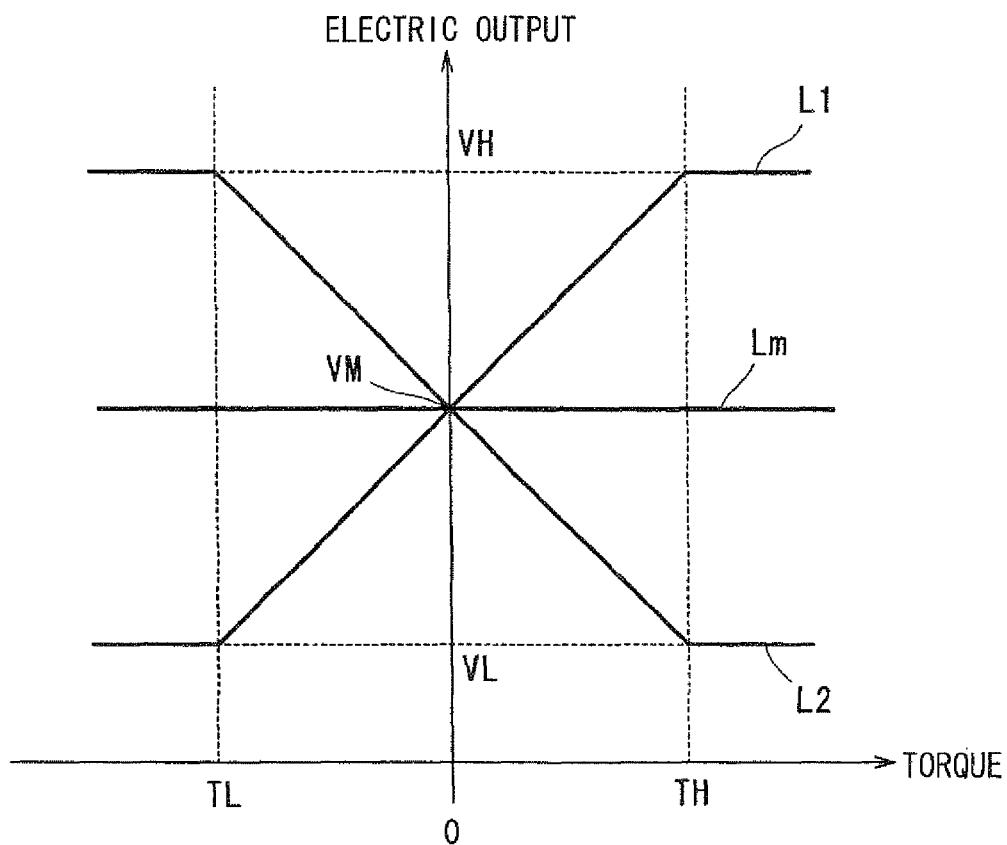
FIG. 4A is a graph showing an electric output signal of the torque sensor relative to a torque in the first embodiment.

The Hall ICs 13 and 14 are configured to generate the electric output signals in different magnitudes from each other relative to the same amount of twisting of the torsion bar 21, that is, relative to the same torque applied to the steering wheel 3. For example, the Hall ICs 13 and 14 are configured to generate respective electric output signals indicated by output characteristic lines L1 and L2 in FIG. 4A, relative to the applied torque.

As indicated by the output characteristic lines L1 and L2, the electric output signals (voltages) are set to vary between an upper limit VH and a lower limit VL, and be line-symmetric with respect to a straight line Lm, which passes through an intermediate value VM between the upper limit VH and the lower limit VL. The straight line Lm is a line of correlation, which satisfies that the electric output signal equals the intermediate value VM, in the graph with the abscissa being the torque and the ordinate being the electric output signal. The torque is indicated as being positive and negative when the steering wheel 3 is turned in the clockwise direction and the counter-clockwise direction, respectively.

According to the output characteristic line L1, the electric output signal is fixed to the lower limit VL, when the torque varies in the negative region and its absolute value varies in the range greater than a negative threshold value TL. Further, the electric output signal is fixed to the upper limit VH, when the torque varies in the positive region and its absolute value varies in the range greater than a positive threshold value TH. The electric output signal varies along a positive linear line of correlation between a point (TL, VL) and a point (TH, VH) in the coordinate system, in which a coordinate point represents (torque, electric output signal), when the torque varies between the threshold values TL and TH.

According to the output characteristic line L2, on the other hand, the electric output signal is fixed to the higher limit VH, when the torque varies in the negative region and its absolute value varies in the range greater than the negative threshold value TL. Further, the electric output signal is fixed to the lower limit VL, when the torque varies in the positive region and its absolute value varies in the range greater than the positive threshold value TH. The electric output signal varies along a negative linear line of correlation between a point (TL, VH) and a point (TH, VL) in the coordinate system (torque, electric output signal), when the torque varies between the threshold values TL and TH. The output characteristic lines L1 and L2 are stored in the ECU 6, and used in a variety of control processing such as calculations of torque detection values and the like.

The ECU 6 is configured by a microcomputer (MC) 30, a drive circuit 31, noise filtering-out capacitors 29, pull-down resistors 32 and the like, which are mounted on a substrate (not shown). The microcomputer 30 performs an arithmetic operation and the like for controlling the operation of the electric motor 2 in response to the electric output signals inputted from the Hall ICs 13 and 14. The drive circuit 31 drives the electric motor 2 as commanded by the microcomputer 30. The pull-down resistors 32 stabilize the electric output signals received from the torque sensor 5. The microcomputer 30 is in the conventional configuration, which includes a CPU for performing control processing and arithmetic processing, memories such as a ROM and a RAM for storing various programs and various data, input devices and output devices. The data stored in the ROM includes data of the output characteristic lines L1 and L2.

The microcomputer 30 acquires a variety of detection values required to control the operation of the electric motor 2 and calculates, for example, a command value of current supplied to the electric motor 2 based on the electric output signals of the torque sensor 5 and other sensors. The microcomputer 30 further outputs a control signal applied to the drive circuit based on the calculated command value. As a result, the electric motor 2 is energized in accordance with the command value to assist the applied torque.

The EPS 1 also includes, as shown in FIGS. 1 and 3, two wheel speed sensors (SPD) 34 and 35, which are fixed to the front left steered wheel 8 and the front right steered wheel 8, respectively. These sensors 34 and 35 are provided as a portion of rotation speed difference detection part for detecting a difference between rotation speeds SPD of the left steered wheel 8 and the right steered wheel 8. Alternatively, the wheel speed sensors 34 and 35 may be fixed to the rear left steered wheel 8 and the rear right steered wheel 8 to detect the rotation speed difference between the left side and the right side of the vehicle.

The wheel speed sensors 34 and 35 are fixed to the steered wheels 8 at the left side and the right side, respectively, of the front or rear steered wheels as electromagnetic sensors. Each sensor 34, 35 is configured to have a magnetic rotor having teeth on its outer periphery and driven by the steered wheel and an output part for generating an electric output signal in a pulse form corresponding to the rotation of the teeth.

Each wheel speed sensor 34 and 35 may be another type of electromagnetic sensor, which includes a rotating magnet fixed to the steered wheel and having a plurality of magnetic poles on its outer periphery and an output part for generating an electric output signal in a pulse form corresponding to the rotation of the rotating magnet.

The microcomputer 30 of the ECU 6, as a portion of the speed difference detection part, calculates the rotation speed difference from the difference in the number of pulses generated by the wheel speed sensors 34 and 35 per unit time.

The microcomputer 30 is further configured to operate as a failure checking part for checking whether any one of the Hall ICs 13 and 14 is in failure. For this function, the microcomputer calculates a sum SUMV of the electric output signals of the Hall ICs 13 and 14.

The microcomputer 30 determines that either one of the Hall ICs is in failure, if the calculated sum SUMV becomes greater than a higher limit value (2VM+$\alpha$) or less than a lower limit value (2VM-$\alpha$). The higher limit value may be predetermined to be a sum of two times of the intermediate value VM and a positive allowance range +$\alpha$. The lower limit value may be predetermined to be a sum of two times of the intermediate value VM and a negative allowance range -$\alpha$.

When the microcomputer 30 determines that one of the Hall ICs 13 and 14 is in failure, the microcomputer 30 operates as a failing device specifying part to specify which one of the Hall ICs 13 and 14 is in failure based on the rotation speed difference and the electric output signals of the Hall ICs 13 and 14. The Hall IC, which is determined to be in failure, is referred to as a failing device. The Hall IC, which is not determined to be in failure, is referred to as a non-failing (normal) device.

Figure 4B:
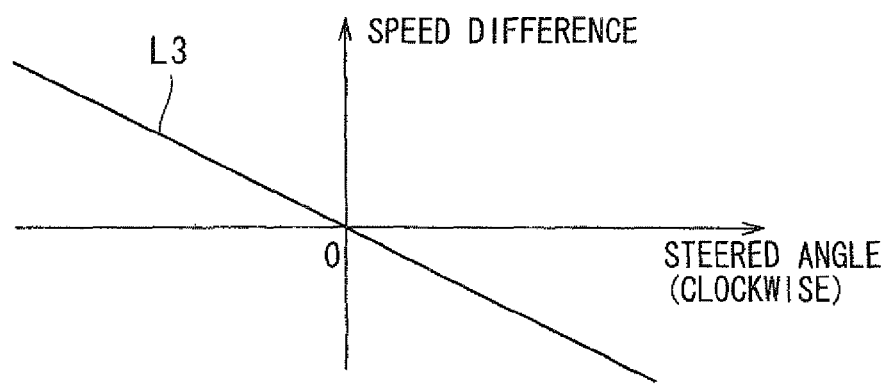
FIG. 4B is a graph showing a rotation speed difference relative to a steering angle in the first embodiment.

The microcomputer 30 is configured to check whether the steering wheel 3 is steered in the clockwise direction or the counterclockwise direction based on the rotation speed difference, when there is a failing device. The microcomputer 30 stores therein a characteristic line L3 as shown in FIG. 4B, which defines a relation between the steered angle of the steered wheels 8 and the rotation speed difference between the left and right steered wheels 8.

This characteristic line L3 is indicated in a coordinate system, in which abscissa indicates the steered angle and ordinate indicates the rotation speed difference. In this example, the steered angle is a positive value and a negative value when the wheels 8 are steered in the right direction and the left direction, respectively. The rotation speed difference is determined by subtracting the rotation speed of the front left steered wheel 8 from the rotation speed of the right steered wheel 8. Therefore the characteristic line L3 is a linear line having a negative inclination and passing through the point of origin (0) of the coordinate system (steered angle, rotation speed difference).

The microcomputer 30 determines that, if the rotation speed difference is a negative value, the steered angle is determined to be positive from the characteristic line L3. This means that the steering wheel 3 is determined to be steered in the clockwise direction. On the other hand, the microcomputer 30 determines that, if the rotation speed difference is a positive value, the steered angle is determined to be negative from the characteristic line L3. This means that the steering wheel 3 is steered in the counter-clockwise direction.

The microcomputer 30 is further configured to estimate a present numerical value range of the electric output signal of each Hall IC 13, 14 based on the determined steering direction and the characteristic lines L1 and L2. The microcomputer 30 checks whether the numerical value of the actual electric output signal is within the estimated numerical value range.

For example, the microcomputer 30 estimates the present numerical value range of the electric output signal of the Hall IC 13 as follows.

If it is determined that the steering wheel 3 is steered clockwise, the microcomputer 30 determines that the torque applied to the steering wheel 3 is a positive value.

Figure 5:
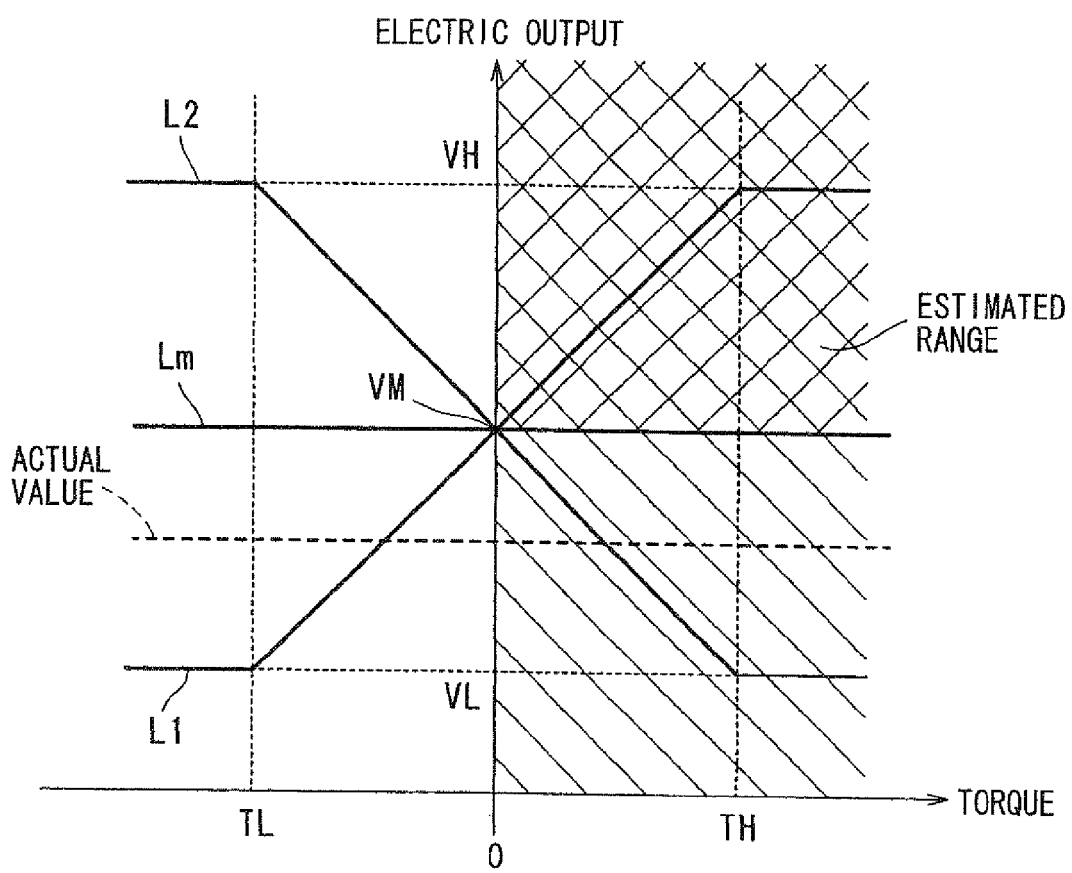
FIG. 5 is a graph showing a method of specifying a failing device based on the rotation speed difference.

That is, the microcomputer 30 determines that the present coordinate point regarding the Hall IC 13 is within the right side area of the ordinate in the coordinate system (torque, electric output) shown in FIG. 5. Based on that the estimated range is determined with respect to the Hall IC 13, the microcomputer 30 determines that the present coordinate point of the Hall IC 13 in the coordinate system is in the range above the line Lm by referring to the right side of the ordinate with respect to the characteristic line L1.

Thus, the microcomputer 30 determines that the present coordinate point of the Hall IC 13 is within the range, which is on the right of the ordinate and above the linear line Lm in FIG. 5. That is, the microcomputer 30 estimates that the present output value of the Hall IC 13 is greater than the intermediate value VM based on the determined steering direction (right or clockwise direction).

If the actual output value of the Hall IC 13 is less than the intermediate value VM relative to the estimated range, which is greater than the intermediate value VM, the microcomputer 30 determines that the actual value is not included within the estimated numerical range. Thus, the microcomputer 30 specifies the Hall IC 13 to be the failing device.

The microcomputer 30 performs the similar processing with respect to the Hall IC 14 to check whether the Hall IC 14 is the failing device or the non-failing device. If the Hall IC 14 is determined to be the non-failing device, the microcomputer 30 stops using the electric output signal of the Hall IC 13 but continues to control the power-assisting operation of the electric motor 2 based on only the electric output signal of the Hall IC 14.

Figure 6:
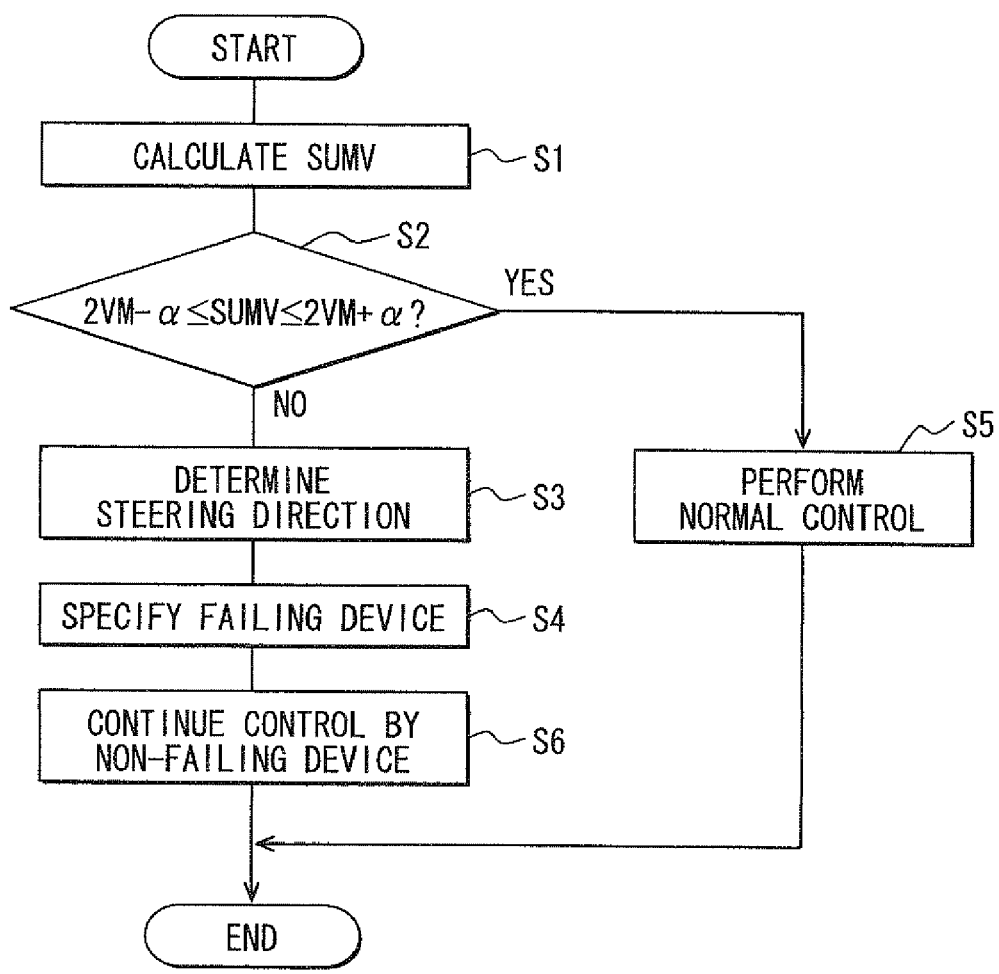
FIG. 6 is a flowchart of processing executed by the ECU in the first embodiment.

The control operation by the microcomputer 30 for the EPS 1 is further described with reference to a flowchart shown in FIG. 6.

First, at S1, the sum SUMV is calculated based on the electric output signals of the Hall ICs 13 and 14. At S2, it is checked whether the sum SUMV is within a predetermined range between 2VM+$\alpha$ and 2VM-$\alpha$. If the sum SUMV is not within the predetermined range (S2: NO), it is determined that one of the Hall ICs 13 and 14 is in failure.

In this case, at S3, the direction of steering operation of the steering wheel 3 is determined at S3 based on the rotation speed difference. At S4, the failing device is specified based on the determined steering direction. If the sum SUMV is within the predetermined range (S2: YES), normal control of the electric motor 2 is performed based on at least one of the electric output signal of the Hall ICs 13 and 14.

At S4, each of the Hall ICs 13 and 14 is checked whether it is the failing device or the non-failing device. More specifically, with respect to the Hall IC 13, the numerical range of the electric output signal of the Hall IC 13 is estimated based on the determined steering direction and the characteristic line L1. Then, it is checked whether the numerical value of the actual electric output signal of the Hall IC 13 is within the estimated numerical range.

If the numerical value of the electric output signal generated by the Hall IC 13 is not within the estimated range, the Hall IC 13 is specified to be the failing device. If it is within the estimated range, the Hall IC is specified to be the non-failing device.

With respect to the Hall IC 14, it is determined to be the failing device or the non-failing device based on the determined steering direction and the characteristic line L2 in the similar manner as the Hall IC 13. Finally, at S6, the use of the electric output signal of the failing device is prohibited and the electric motor 2 is continued to be controlled based on only the electric output signal of the non-failing device.

The EPS 1 of the first embodiment has the following advantages.

The EPS 1 has the wheel speed sensors 34 and 35 and calculates the difference between the rotation speeds of the left and right steered wheels 8 by the ECU 6. The ECU 6 further controls the operation of the electric motor 2 based on the output signals of the two Hall ICs 13 and 14 of the torque sensor 5. The microcomputer 30 of the ECU 6 operates as the failure checking part for checking whether any one of the Hall ICs 13 and 14 is in failure, and as the failing device specifying part for specifying the failing one of the Hall ICs 13 and 14 based on the rotation speed difference and the two electric output signals when it is determined that there is a failing device.

Thus, the microcomputer 30 can specify the failing device accurately based on the difference between the rotation speeds of the left and right steered wheels 8 and the output signal of the torque sensor 5. This is possible, because the rotation speed difference and the electric output signal of the torque sensor 5 have correlation therebetween. That is, the rotation speed difference varies with the steered angle of the steered wheels 8 and the steered angle of the wheels 8 varies with the torque applied to the steering wheel 3.

Therefore, it is possible to check whether the Hall IC 13 or 14 generating the output signal for comparison is failing (failing device) or not (non-failing device), by comparing a direct value calculated based on the actual output signal with an indirect value estimated based on the rotation speed difference. The control of the electric motor 2 is continued by using only the output signal of the non-failing device and stopping use of the output signal of the failing device. As a result, the power-assisting operation by the electric motor 2 can be performed persistently without stopping nor reducing the assisting power.

Normally in the EPS 1, failure will rarely occur in mechanical parts but may occur possibly in only an electric signal output system of the torque sensor 5 to the ECU 6. In the case that two Hall ICs 13 and 14 are provided in the torque sensor 5, any failure of the EPS 1 can be countered by configuring the ECU 6 as described above. That is, the power-assisting operation of the EPS 1 can be maintained without reducing the assisting power.

Since recent vehicles are provided with a speed sensor for each steered wheel 8, it is possible to configure the EPS 1, which can specify the failing device, in reduced cost by using the difference between the rotation speeds of the left and right steered wheels 8.

The microcomputer 30 stores therein the correlation between the torque and the output signal as the characteristic lines L1 and L2 of the Hall ICs 13 and 14. When the microcomputer 30 determines any failure in the Hall IC 13 or 14, the microcomputer 30 further checks whether the steering wheel 3 is turned clockwise or counter-clockwise, estimates the present numerical range of the output signal for each Hall IC 13, 14 based on the determined steering direction and the characteristic line L1, L2, and checks whether the actual value of the electric output signal of the Hall IC 13, 14 is within the estimated range.

Thus, the microcomputer 30 determines the indirect value by estimating the numerical value range of the electric output signal after the steering operation based on the determined steering direction, and compares the actual value of the electric output signal with the indirect value (estimated range). In this operation, since the microcomputer 30 determines the steering direction by using the rotation speed difference and estimates the numerical value range based on the determined steering direction, the numerical value range can be estimated readily.

Since the steering direction is only left (counter-clockwise) or right (clockwise), the estimated numerical value range is defined in either the left side or the right side of the ordinate in the coordinate system of torque and electric output signal as shown in FIG. 5. Thus, the numerical value range can be estimated readily by using the steering direction.

Second Embodiment

An EPS 1 according to a second embodiment is different from the first embodiment in respect of specifying a failing device. Specifically, in the second embodiment, a microcomputer 30 estimates a change rate of an electric output signal of each Hall IC 13, 14 based on a change rate of a rotation speed difference and characteristic lines L1 and L2. Here, the change rate of a certain parameter is defined as an amount of change of the parameter per unit time. The microcomputer 30 further compares, with respect to each Hall IC 13, 14, a change rate of an actual electric output signal of the Hall IC 13, 14 with the estimated change rate.

Figure 7A:
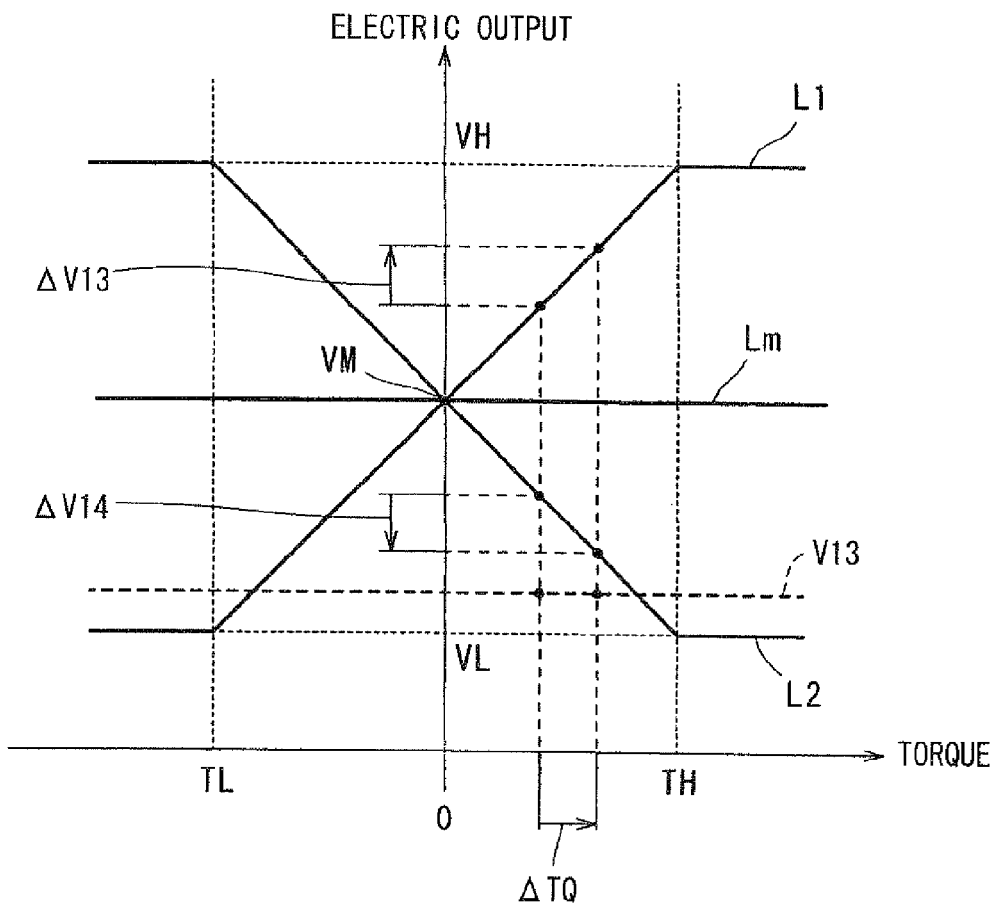
FIG. 7A is a graph showing an electric output signal of the torque sensor relative to a torque in a second embodiment of the present invention.
Figure 7B:
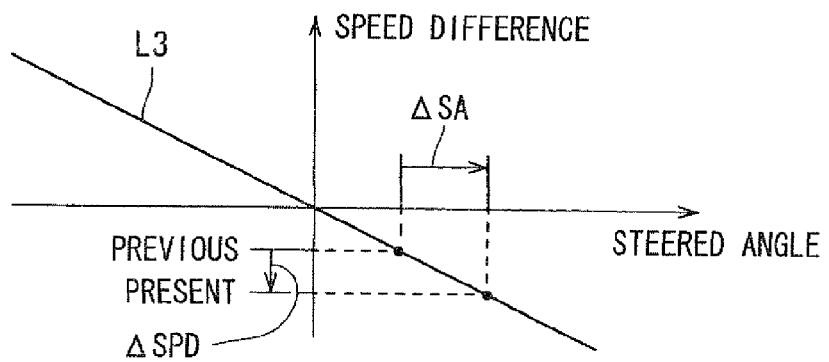
FIG. 7B is a graph showing a rotation speed difference relative to a steering angle in the second embodiment.

For example, the microcomputer 30 is configured to calculate a change rate of the rotation speed difference ΔSPD between a previous rotation speed and a present rotation speed detected at a predetermined sampling interval. The microcomputer 30 is further configured to calculate a change rate of the steered angle ΔSA between a previous steered angle and a present steered angle detected at a predetermined sampling interval based on the characteristic line L3 as shown in FIG. 7B.

The microcomputer 30 stores therein the relation between the steered angle of the steered wheels 8 and the torque applied to the steering wheel 3 with respect to each travel condition such as vehicle travel speed. The microcomputer 30 is further configured to calculate a change rate of the torque ΔTQ between a previous torque and a present torque detected at a predetermined sampling interval based on the correlation between the steered angle and the torque, the calculated change rate of the steered angle and the like. The microcomputer 30 is further configured to estimate a change rate of the electric output signal of each of the Hall ICs 13 and 14 ΔV13 and ΔV14 based on the calculated change rate of the torque and the characteristic lines L1 and L2 as shown in FIG. 7A.

If the electric output signal actually generated by the Hall IC 13 does not vary with the torque and stay unchanged, for example, the present value and the previous value of the electric output signals of the Hall IC 13 are the same and hence the change rate of the electric output signal is zero. In this instance, the microcomputer 30 determines that the Hall IC 13 is in failure, because the estimated change rate of the output signal and the actual change rate of the output signal of the Hall IC 13 are clearly different from each other.

Figure 8:
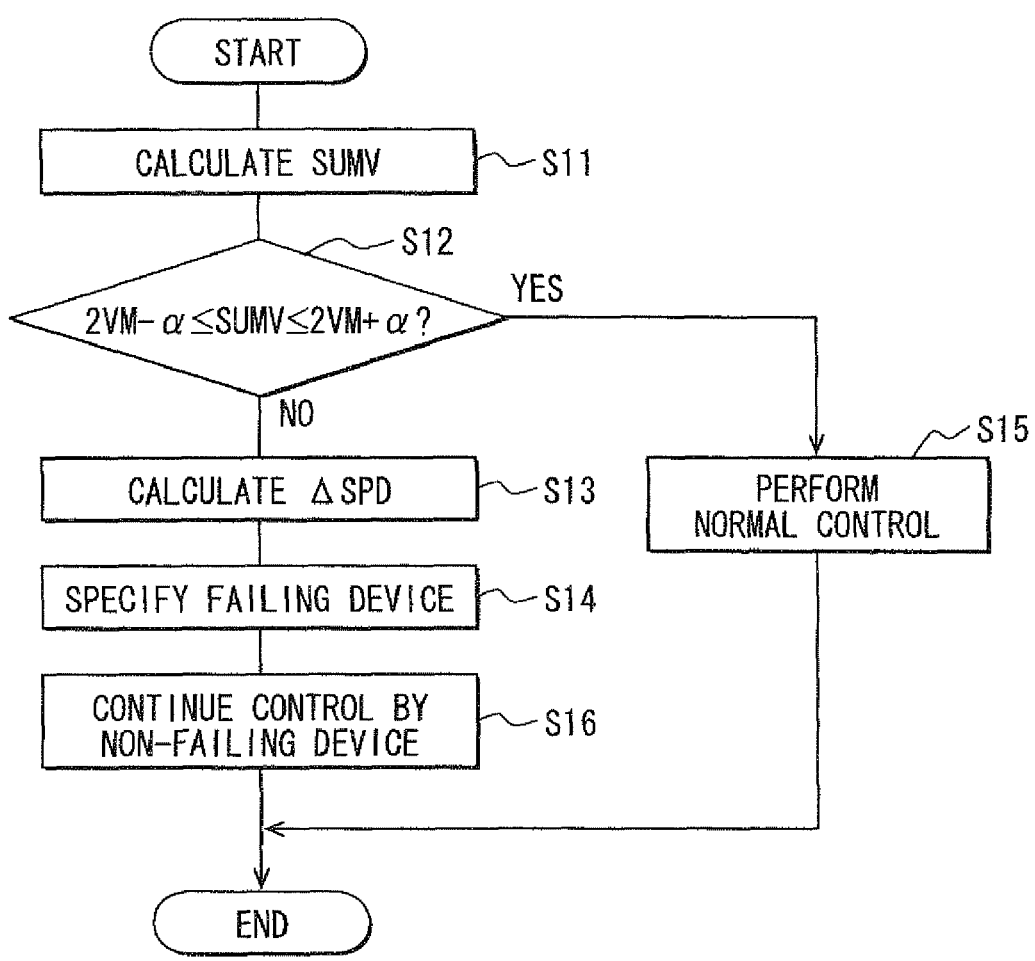
FIG. 8 is a flowchart of processing executed by the ECU in the second embodiment.

The control operation by the microcomputer of the EPS 1 according to the second embodiment is further described with reference to a flowchart shown in FIG. 8. S11, S12, S15 and S16 in the second embodiment (FIG. 8) are the same as S1, S2, S5 and S6 in the first embodiment (FIG. 6), respectively. Therefore, only S13 and S14 are described in detail.

At S13, the change rate of the rotation speed difference ΔSPD is calculated based on a previous rotation speed difference and a present rotation speed difference. Further at S14, the failing device is specified based on the calculated change rate of the rotation speed difference.

At S12 to S14, each of the Hall ICs 13 and 14 is checked. Specifically, with respect to the Hall IC 13, the change rate of its electric output signal is estimated based on the calculated change rate of the rotation speed difference, the characteristic line L3, the correlation between the steered angle and the torque, characteristic line L1 and the like. Further, the actual change rate of the output signal of the Hall IC 13 is calculated based on the difference between the present actual value and the previous actual value of the electric output signal.

It is checked whether the Hall IC 13 is the failing device or the non-failing device by comparing the estimated change rate of the electric output signal and the change rate of the actual output signal with respect to the Hall IC 13. With respect to the Hall IC 14, it is checked whether it is in failure or not based on the calculated change rate of the rotation speed difference, the characteristic line L3, the correlation between the steered angle and the torque, the characteristic line L2 and the like.

The EPS 1 of the second embodiment has the following advantage.

With respect to each of the Hall ICs 13 and 14, the microcomputer 30 of the EPS 1 estimates the change rate of the output signal of the Hall IC 13, 14 based on the change rate of the rotation speed difference, the correlation characteristic lines L1, L2 and L3, and compares the actual change rate of the output signal with the estimated change rate of the output signal. Since the change rate can be calculated within a short period by using the present value and the previous value, the failing device and the non-failing device can be readily determined.

Other Embodiment

The torque sensor 5 may be configured to have three or more Hall ICs. In this instance, if there are two or more non-failing devices, it may be checked by other checking parts whether the output signal of each of such non-failing devices is normal. The electric motor 2 may be controlled based on the electric output signal of the non-failing device, which also has no abnormality in its electric output signal.

It is also possible to specify periodically at a predetermined interval the failing device based on the rotation speed difference and the electric output signals of the Hall ICs 13 and 14, in place of specifying the failing device after checking failure in any of the Hall ICs 13 and 14.

The torque sensor 5 may be other than an electromagnetic type.

The present invention may further be implemented in many other embodiments.

What is claimed is:

1. An electric power steering system of a vehicle comprising:
    an electric motor that generates output power for power-assisting steering operation of a steering wheel of the vehicle;
    a torque sensor including a plurality of output generating parts configured to generate a plurality of electric output signals corresponding to a torque applied to the steering wheel;
    a control unit configured to control the steering operation of the electric motor in accordance with at least one of the electric output signals of the torque sensor; wherein:
    the control unit includes a difference detection part, a failure checking part and a failing device specifying part;
    the difference detection part is configured to detect a difference between rotation speeds of a left steered wheel and a right steered wheel of the vehicle;
    the failure checking part is configured to check whether any one of the plurality of output generating parts is in failure;
    the failing-device specifying part is configured to specify a failing-device based on the rotation speed difference and the plurality of electric output signals;
    the control unit is configured to store a characteristic line defining a relation between the torque and the electric output signal with respect to each of the plurality of output generating parts; and
    the failing device specifying part is configured to check whether the steering wheel is steered in a clockwise direction or in a counter-clockwise direction based on the difference of the rotation speed, estimate a present numerical value range of the electric output signal of each of the plurality of output generating parts based on a direction of steering of the steering wheel and the characteristic line, and check whether an actual value of the electric output signal is within an estimated present numerical value range.

2. The electric power steering system according to claim 1, wherein:
    the torque sensor includes a magnetic flux generating part for generating magnetic flux varying with a steering operation of the steering wheel; and
    the plurality of output generating parts generates the electric output signals in accordance with the magnetic flux.

3. An electric power steering system of a vehicle comprising:
    an electric motor that generates output power for power-assisting steering operation of a steering wheel of the vehicle;
    a torque sensor including a plurality of output generating parts configured to generate a plurality of electric output signals corresponding to a torque applied to the steering wheel; and
    a control unit configured to control the steering operation of the electric motor based on the plurality of electric output signals of the torque sensor; wherein:
    the control unit further includes a difference detecting part and a failing-device specifying part;

the difference detecting part configured to detect a difference of rotation speeds between a left steered wheel and a right steered wheel of the vehicle; and the failing-device specifying part is configured to specify periodically a failing device among the plurality of output generating parts based on the difference of rotation speeds and the plurality of electric output signals;

the control unit is configured to store a characteristic line defining a relation between the torque and the electric output signal with respect to each of the plurality of output generating parts; and the failing device specifying part is configured to estimate a change rate of the electric output signal of each of the plurality of output generating parts based on the difference of the rotation speed and the characteristic line, and compare an actual change rate of the output signal of each of the plurality of output generating parts with an estimated change rate.

4. The electric power steering system according to claim 3, wherein:

the torque sensor includes a magnetic flux generating part for generating magnetic flux varying with a steering operation of the steering wheel; and the plurality of output generating parts generates the electric output signals in accordance with the magnetic flux.

* * * * *